United States Patent
Ivey et al.

(10) Patent No.: US 8,444,292 B2
(45) Date of Patent: May 21, 2013

(54) END CAP SUBSTITUTE FOR LED-BASED TUBE REPLACEMENT LIGHT

(75) Inventors: John Ivey, Farmington Hills, MI (US); David L Simon, Grosse Pointe Woods, MI (US)

(73) Assignee: iLumisys, Inc., Troy, MI (US)

( * ) Notice: Subject to any disclaimer, the term of this patent is extended or adjusted under 35 U.S.C. 154(b) by 720 days.

(21) Appl. No.: 12/573,233

(22) Filed: Oct. 5, 2009

(65) Prior Publication Data

US 2010/0103673 A1    Apr. 29, 2010

Related U.S. Application Data

(60) Provisional application No. 61/108,345, filed on Oct. 24, 2008.

(51) Int. Cl.
- *F21S 4/00* (2006.01)
- *B29C 65/00* (2006.01)
- *B23P 6/00* (2006.01)

(52) U.S. Cl.
USPC ...... 362/225; 362/249.02; 156/60; 29/402.08

(58) Field of Classification Search
USPC ......................................... 362/225, 217, 116
See application file for complete search history.

(56) References Cited

U.S. PATENT DOCUMENTS

| | | |
|---|---|---|
| D54,511 S | 2/1920 | Owen |
| D58,105 S | 6/1921 | Poritz |
| D79,814 S | 11/1929 | Hoch |
| D80,419 S | 1/1930 | Kramer |
| D84,763 S | 7/1931 | Stange |
| D119,797 S | 4/1940 | Winkler et al. |
| D125,312 S | 2/1941 | Logan |
| 2,909,097 A | 10/1959 | Alden et al. |
| 3,272,977 A | 9/1966 | Holmes |
| 3,318,185 A | 5/1967 | Kott |
| 3,561,719 A | 2/1971 | Grindle |
| 3,586,936 A | 6/1971 | McLeroy |

(Continued)

FOREIGN PATENT DOCUMENTS

| | | |
|---|---|---|
| CN | 1584388 A | 2/2005 |
| CN | 2766345 Y | 3/2006 |

(Continued)

OTHER PUBLICATIONS

Wolsey, Robert. Interoperable Systems: The Future of Lighting Control, Lighting Research Center, Jan. 1, 1997, vol. 2 No. 2, Rensselaer Polytechnic Institute, Troy, New York [online]. Retrieved Lighting Research Center Web Page using Internet <URL: http://www.lrc.rpi.edu/programs/Futures/LF-BAS/index.asp>.

(Continued)

*Primary Examiner* — Tracie Y Green
(74) *Attorney, Agent, or Firm* — Young Basile

(57) ABSTRACT

Disclosed herein is a replacement light for a fluorescent tube usable in a fluorescent fixture. The light includes a housing having a first end and a second end opposite the first end. A support structure is disposed within the housing. At least one LED is positioned within the housing and is arranged on the support structure. A first seal has at least one aperture and is disposed within the first end of the housing. The first seal is configured to conform to an inner circumference of the first end of the housing. At least one electrical connector extends through the at least one aperture is and connectable to the fluorescent fixture.

26 Claims, 1 Drawing Sheet

U.S. PATENT DOCUMENTS

| | | |
|---|---|---|
| 3,601,621 A | 8/1971 | Ritchie |
| 3,612,855 A | 10/1971 | Juhnke |
| 3,643,088 A | 2/1972 | Osteen et al. |
| 3,746,918 A | 7/1973 | Drucker et al. |
| 3,818,216 A | 6/1974 | Larraburu |
| 3,832,503 A | 8/1974 | Crane |
| 3,858,086 A | 12/1974 | Anderson et al. |
| 3,909,670 A | 9/1975 | Wakamatsu et al. |
| 3,924,120 A | 12/1975 | Cox, III |
| 3,958,885 A | 5/1976 | Stockinger et al. |
| 3,974,637 A | 8/1976 | Bergey et al. |
| 3,993,386 A | 11/1976 | Rowe |
| 4,001,571 A | 1/1977 | Martin |
| 4,054,814 A | 10/1977 | Fegley et al. |
| 4,070,568 A | 1/1978 | Gala |
| 4,082,395 A | 4/1978 | Donato et al. |
| 4,096,349 A | 6/1978 | Donato |
| 4,102,558 A | 7/1978 | Krachman |
| 4,107,581 A | 8/1978 | Abernethy |
| 4,189,663 A | 2/1980 | Schmutzer et al. |
| 4,211,955 A | 7/1980 | Ray |
| 4,241,295 A | 12/1980 | Williams, Jr. |
| 4,271,408 A | 6/1981 | Teshima et al. |
| 4,271,458 A | 6/1981 | George, Jr. |
| 4,272,689 A | 6/1981 | Crosby et al. |
| 4,273,999 A | 6/1981 | Pierpoint |
| 4,298,869 A | 11/1981 | Okuno |
| 4,329,625 A | 5/1982 | Nishizawa et al. |
| 4,339,788 A | 7/1982 | White et al. |
| 4,342,947 A | 8/1982 | Bloyd |
| 4,367,464 A | 1/1983 | Kurahashi et al. |
| D268,134 S | 3/1983 | Zurcher |
| 4,382,272 A | 5/1983 | Quella et al. |
| 4,388,567 A | 6/1983 | Yamazaki et al. |
| 4,388,589 A | 6/1983 | Molldrem, Jr. |
| 4,392,187 A | 7/1983 | Bornhorst |
| 4,394,719 A | 7/1983 | Moberg |
| 4,420,711 A | 12/1983 | Takahashi et al. |
| 4,455,562 A | 6/1984 | Dolan et al. |
| 4,500,796 A | 2/1985 | Quin |
| 4,581,687 A | 4/1986 | Nakanishi |
| 4,597,033 A | 6/1986 | Meggs et al. |
| 4,600,972 A | 7/1986 | MacIntyre |
| 4,607,317 A | 8/1986 | Lin |
| 4,622,881 A | 11/1986 | Rand |
| 4,625,152 A | 11/1986 | Nakai |
| 4,635,052 A | 1/1987 | Aoike et al. |
| 4,647,217 A | 3/1987 | Havel |
| 4,656,398 A | 4/1987 | Michael et al. |
| 4,661,890 A | 4/1987 | Watanabe et al. |
| 4,668,895 A | 5/1987 | Schneiter |
| 4,675,575 A | 6/1987 | Smith et al. |
| 4,682,079 A | 7/1987 | Sanders et al. |
| 4,686,425 A | 8/1987 | Havel |
| 4,687,340 A | 8/1987 | Havel |
| 4,688,154 A | 8/1987 | Nilssen |
| 4,688,869 A | 8/1987 | Kelly |
| 4,695,769 A | 9/1987 | Schweickardt |
| 4,698,730 A | 10/1987 | Sakai et al. |
| 4,701,669 A | 10/1987 | Head et al. |
| 4,705,406 A | 11/1987 | Havel |
| 4,707,141 A | 11/1987 | Havel |
| D293,723 S | 1/1988 | Buttner |
| 4,727,289 A | 2/1988 | Uchida |
| 4,740,882 A | 4/1988 | Miller |
| 4,748,545 A | 5/1988 | Schmitt |
| 4,753,148 A | 6/1988 | Johnson |
| 4,758,173 A | 7/1988 | Northrop |
| 4,771,274 A | 9/1988 | Havel |
| 4,780,621 A | 10/1988 | Bartleucci et al. |
| 4,794,383 A | 12/1988 | Havel |
| 4,810,937 A | 3/1989 | Havel |
| 4,818,072 A | 4/1989 | Mohebban |
| 4,824,269 A | 4/1989 | Havel |
| 4,837,565 A | 6/1989 | White |
| 4,843,627 A | 6/1989 | Stebbins |
| 4,845,481 A | 7/1989 | Havel |
| 4,845,745 A | 7/1989 | Havel |
| 4,851,972 A | 7/1989 | Altman |
| 4,857,801 A | 8/1989 | Farrell |
| 4,863,223 A | 9/1989 | Weissenbach et al. |
| 4,870,325 A | 9/1989 | Kazar |
| 4,874,320 A | 10/1989 | Freed et al. |
| 4,887,074 A | 12/1989 | Simon et al. |
| 4,894,832 A | 1/1990 | Colak |
| 4,901,207 A | 2/1990 | Sato et al. |
| 4,912,371 A | 3/1990 | Hamilton |
| 4,922,154 A | 5/1990 | Cacoub |
| 4,934,852 A | 6/1990 | Havel |
| 4,941,072 A | 7/1990 | Yasumoto et al. |
| 4,943,900 A | 7/1990 | Gartner |
| 4,962,687 A | 10/1990 | Belliveau et al. |
| 4,965,561 A | 10/1990 | Havel |
| 4,973,835 A | 11/1990 | Kurosu et al. |
| 4,979,081 A | 12/1990 | Leach et al. |
| 4,980,806 A | 12/1990 | Taylor et al. |
| 4,992,704 A | 2/1991 | Stinson |
| 5,003,227 A | 3/1991 | Nilssen |
| 5,008,595 A | 4/1991 | Kazar |
| 5,008,788 A | 4/1991 | Palinkas |
| 5,010,459 A | 4/1991 | Taylor et al. |
| 5,018,054 A | 5/1991 | Ohashi et al. |
| 5,027,037 A | 6/1991 | Wei |
| 5,027,262 A | 6/1991 | Freed |
| 5,032,960 A | 7/1991 | Katoh |
| 5,034,807 A | 7/1991 | Von Kohorn |
| 5,036,248 A | 7/1991 | McEwan et al. |
| 5,038,255 A | 8/1991 | Nishihashi et al. |
| 5,065,226 A | 11/1991 | Kluitmans et al. |
| 5,072,216 A | 12/1991 | Grange |
| 5,078,039 A | 1/1992 | Tulk et al. |
| 5,083,063 A | 1/1992 | Brooks |
| 5,088,013 A | 2/1992 | Revis |
| 5,089,748 A | 2/1992 | Ihms |
| 5,103,382 A | 4/1992 | Kondo et al. |
| 5,122,733 A | 6/1992 | Havel |
| 5,126,634 A | 6/1992 | Johnson |
| 5,128,595 A | 7/1992 | Hara |
| 5,130,909 A | 7/1992 | Gross |
| 5,134,387 A | 7/1992 | Smith et al. |
| 5,140,220 A | 8/1992 | Hasegawa |
| 5,142,199 A | 8/1992 | Elwell |
| 5,151,679 A | 9/1992 | Dimmick |
| 5,154,641 A | 10/1992 | McLaughlin |
| 5,161,879 A | 11/1992 | McDermott |
| 5,161,882 A | 11/1992 | Garrett |
| 5,164,715 A | 11/1992 | Kashiwabara et al. |
| 5,184,114 A | 2/1993 | Brown |
| 5,194,854 A | 3/1993 | Havel |
| 5,198,756 A | 3/1993 | Jenkins et al. |
| 5,209,560 A | 5/1993 | Taylor et al. |
| 5,220,250 A | 6/1993 | Szuba |
| 5,225,765 A | 7/1993 | Callahan et al. |
| 5,226,723 A | 7/1993 | Chen |
| 5,254,910 A | 10/1993 | Yang |
| 5,256,948 A | 10/1993 | Boldin et al. |
| 5,278,542 A | 1/1994 | Smith et al. |
| 5,282,121 A | 1/1994 | Bornhorst et al. |
| 5,283,517 A | 2/1994 | Havel |
| 5,287,352 A | 2/1994 | Jackson et al. |
| 5,294,865 A | 3/1994 | Haraden |
| 5,298,871 A | 3/1994 | Shimohara |
| 5,301,090 A | 4/1994 | Hed |
| 5,303,124 A | 4/1994 | Wrobel |
| 5,307,295 A | 4/1994 | Taylor et al. |
| 5,321,593 A | 6/1994 | Moates |
| 5,323,226 A | 6/1994 | Schreder |
| 5,329,431 A | 7/1994 | Taylor et al. |
| 5,344,068 A | 9/1994 | Haessig |
| 5,350,977 A | 9/1994 | Hamamoto et al. |
| 5,357,170 A | 10/1994 | Luchaco et al. |
| 5,371,618 A | 12/1994 | Tai et al. |
| 5,374,876 A | 12/1994 | Horibata et al. |
| 5,375,043 A | 12/1994 | Tokunaga |
| D354,360 S | 1/1995 | Murata |
| 5,381,074 A | 1/1995 | Rudzewicz et al. |
| 5,388,357 A | 2/1995 | Malita |

| | | |
|---|---|---|
| 5,402,702 A | 4/1995 | Hata |
| 5,404,282 A | 4/1995 | Klinke et al. |
| 5,406,176 A | 4/1995 | Sugden |
| 5,410,328 A | 4/1995 | Yoksza et al. |
| 5,412,284 A | 5/1995 | Moore et al. |
| 5,412,552 A | 5/1995 | Fernandes |
| 5,420,482 A | 5/1995 | Phares |
| 5,421,059 A | 6/1995 | Leffers, Jr. |
| 5,430,356 A | 7/1995 | Ference et al. |
| 5,432,408 A | 7/1995 | Matsuda et al. |
| 5,436,535 A | 7/1995 | Yang |
| 5,436,853 A | 7/1995 | Shimohara |
| 5,450,301 A | 9/1995 | Waltz et al. |
| 5,461,188 A | 10/1995 | Drago et al. |
| 5,463,280 A | 10/1995 | Johnson |
| 5,463,502 A | 10/1995 | Savage, Jr. |
| 5,465,144 A | 11/1995 | Parker et al. |
| 5,475,300 A | 12/1995 | Havel |
| 5,489,827 A | 2/1996 | Xia |
| 5,491,402 A | 2/1996 | Small |
| 5,493,183 A | 2/1996 | Kimball |
| 5,504,395 A | 4/1996 | Johnson et al. |
| 5,506,760 A | 4/1996 | Giebler et al. |
| 5,513,082 A | 4/1996 | Asano |
| 5,519,496 A | 5/1996 | Borgert et al. |
| 5,530,322 A | 6/1996 | Ference et al. |
| 5,544,809 A | 8/1996 | Keating et al. |
| 5,545,950 A | 8/1996 | Cho |
| 5,550,440 A | 8/1996 | Allison et al. |
| 5,559,681 A | 9/1996 | Duarte |
| 5,561,346 A | 10/1996 | Byrne |
| D376,030 S | 11/1996 | Cohen |
| 5,575,459 A | 11/1996 | Anderson |
| 5,575,554 A | 11/1996 | Guritz |
| 5,581,158 A | 12/1996 | Quazi |
| 5,592,051 A | 1/1997 | Korkala |
| 5,592,054 A | 1/1997 | Nerone et al. |
| 5,600,199 A | 2/1997 | Martin, Sr. et al. |
| 5,607,227 A | 3/1997 | Yasumoto et al. |
| 5,608,290 A | 3/1997 | Hutchisson et al. |
| 5,614,788 A | 3/1997 | Mullins et al. |
| 5,621,282 A | 4/1997 | Haskell |
| 5,621,603 A | 4/1997 | Adamec et al. |
| 5,621,662 A | 4/1997 | Humphries et al. |
| 5,622,423 A | 4/1997 | Lee |
| 5,633,629 A | 5/1997 | Hochstein |
| 5,634,711 A | 6/1997 | Kennedy et al. |
| 5,640,061 A | 6/1997 | Bornhorst et al. |
| 5,640,141 A | 6/1997 | Myllymaki |
| 5,642,129 A | 6/1997 | Zavracky et al. |
| 5,655,830 A | 8/1997 | Ruskouski |
| 5,656,935 A | 8/1997 | Havel |
| 5,661,374 A | 8/1997 | Cassidy et al. |
| 5,661,645 A | 8/1997 | Hochstein |
| 5,673,059 A | 9/1997 | Zavracky et al. |
| 5,682,103 A | 10/1997 | Burrell |
| 5,688,042 A | 11/1997 | Madadi et al. |
| 5,697,695 A | 12/1997 | Lin et al. |
| 5,701,058 A | 12/1997 | Roth |
| 5,712,650 A | 1/1998 | Barlow |
| 5,721,471 A | 2/1998 | Begemann et al. |
| 5,725,148 A | 3/1998 | Hartman |
| 5,726,535 A | 3/1998 | Yan |
| 5,731,759 A | 3/1998 | Finucan |
| 5,734,590 A | 3/1998 | Tebbe |
| 5,751,118 A | 5/1998 | Mortimer |
| 5,752,766 A | 5/1998 | Bailey et al. |
| 5,765,940 A | 6/1998 | Levy et al. |
| 5,769,527 A | 6/1998 | Taylor et al. |
| 5,784,006 A | 7/1998 | Hochstein |
| 5,785,227 A | 7/1998 | Akiba |
| 5,790,329 A | 8/1998 | Klaus et al. |
| 5,803,579 A | 9/1998 | Turnbull et al. |
| 5,803,580 A | 9/1998 | Tseng |
| 5,803,729 A | 9/1998 | Tsimerman |
| 5,806,965 A | 9/1998 | Deese |
| 5,808,689 A | 9/1998 | Small |
| 5,810,463 A | 9/1998 | Kawahara et al. |
| 5,812,105 A | 9/1998 | Van de Ven |
| 5,813,751 A | 9/1998 | Shaffer |
| 5,813,753 A | 9/1998 | Vriens et al. |
| 5,821,695 A | 10/1998 | Vilanilam et al. |
| 5,825,051 A | 10/1998 | Bauer et al. |
| 5,828,178 A | 10/1998 | York et al. |
| 5,836,676 A | 11/1998 | Ando et al. |
| 5,848,837 A | 12/1998 | Gustafson |
| 5,850,126 A | 12/1998 | Kanbar |
| 5,851,063 A | 12/1998 | Doughty et al. |
| 5,852,658 A | 12/1998 | Knight et al. |
| 5,854,542 A | 12/1998 | Forbes |
| RE36,030 E | 1/1999 | Nadeau |
| 5,859,508 A | 1/1999 | Ge et al. |
| 5,865,529 A | 2/1999 | Yan |
| 5,890,794 A | 4/1999 | Abtahi et al. |
| 5,896,010 A | 4/1999 | Mikolajczak et al. |
| 5,907,742 A | 5/1999 | Johnson et al. |
| 5,912,653 A | 6/1999 | Fitch |
| 5,921,660 A | 7/1999 | Yu |
| 5,924,784 A | 7/1999 | Chliwnyj et al. |
| 5,927,845 A | 7/1999 | Gustafson et al. |
| 5,934,792 A | 8/1999 | Camarota |
| 5,943,802 A | 8/1999 | Tijanic |
| 5,946,209 A | 8/1999 | Eckel et al. |
| 5,949,347 A | 9/1999 | Wu |
| 5,952,680 A | 9/1999 | Strite |
| 5,959,547 A | 9/1999 | Tubel et al. |
| 5,962,989 A | 10/1999 | Baker |
| 5,962,992 A | 10/1999 | Huang et al. |
| 5,963,185 A | 10/1999 | Havel |
| 5,974,553 A | 10/1999 | Gandar |
| 5,980,064 A | 11/1999 | Metroyanis |
| 5,998,925 A | 12/1999 | Shimizu et al. |
| 5,998,928 A | 12/1999 | Hipp |
| 6,007,209 A | 12/1999 | Pelka |
| 6,008,783 A | 12/1999 | Kitagawa et al. |
| 6,011,691 A | 1/2000 | Schreffler |
| 6,016,038 A | 1/2000 | Mueller et al. |
| 6,018,237 A | 1/2000 | Havel |
| 6,019,493 A | 2/2000 | Kuo et al. |
| 6,020,825 A | 2/2000 | Chansky et al. |
| 6,025,550 A | 2/2000 | Kato |
| 6,028,694 A | 2/2000 | Schmidt |
| 6,030,099 A | 2/2000 | McDermott |
| 6,031,343 A | 2/2000 | Recknagel et al. |
| D422,737 S | 4/2000 | Orozco |
| 6,056,420 A | 5/2000 | Wilson et al. |
| 6,068,383 A | 5/2000 | Robertson et al. |
| 6,069,597 A | 5/2000 | Hansen |
| 6,072,280 A | 6/2000 | Allen |
| 6,084,359 A | 7/2000 | Hetzel et al. |
| 6,086,220 A | 7/2000 | Lash et al. |
| 6,091,200 A | 7/2000 | Lenz |
| 6,092,915 A | 7/2000 | Rensch |
| 6,095,661 A | 8/2000 | Lebens et al. |
| 6,097,352 A | 8/2000 | Zavracky et al. |
| 6,116,748 A | 9/2000 | George |
| 6,121,875 A | 9/2000 | Hamm et al. |
| 6,127,783 A | 10/2000 | Pashley et al. |
| 6,132,072 A | 10/2000 | Turnbull et al. |
| 6,135,604 A | 10/2000 | Lin |
| 6,139,174 A | 10/2000 | Butterworth |
| 6,149,283 A | 11/2000 | Conway et al. |
| 6,150,774 A | 11/2000 | Mueller et al. |
| 6,151,529 A | 11/2000 | Batko |
| 6,153,985 A | 11/2000 | Grossman |
| 6,158,882 A | 12/2000 | Bischoff, Jr. |
| 6,166,496 A | 12/2000 | Lys et al. |
| 6,175,201 B1 | 1/2001 | Sid |
| 6,175,220 B1 | 1/2001 | Billig et al. |
| 6,181,126 B1 | 1/2001 | Havel |
| 6,183,086 B1 | 2/2001 | Neubert |
| 6,183,104 B1 | 2/2001 | Ferrara |
| 6,184,628 B1 | 2/2001 | Ruthenberg |
| 6,196,471 B1 | 3/2001 | Ruthenberg |
| 6,203,180 B1 | 3/2001 | Fleischmann |
| 6,211,626 B1 | 4/2001 | Lys et al. |
| 6,215,409 B1 | 4/2001 | Blach |
| 6,217,190 B1 | 4/2001 | Altman et al. |

| | | |
|---|---|---|
| 6,219,239 B1 | 4/2001 | Mellberg et al. |
| 6,227,679 B1 | 5/2001 | Zhang et al. |
| 6,238,075 B1 | 5/2001 | Dealey, Jr. et al. |
| 6,241,359 B1 | 6/2001 | Lin |
| 6,250,774 B1 | 6/2001 | Begemann et al. |
| 6,252,350 B1 | 6/2001 | Alvarez |
| 6,252,358 B1 | 6/2001 | Xydis et al. |
| 6,268,600 B1 | 7/2001 | Nakamura et al. |
| 6,273,338 B1 | 8/2001 | White |
| 6,275,397 B1 | 8/2001 | McClain |
| 6,283,612 B1 | 9/2001 | Hunter |
| 6,292,901 B1 | 9/2001 | Lys et al. |
| 6,293,684 B1 | 9/2001 | Riblett |
| 6,297,724 B1 | 10/2001 | Bryans et al. |
| 6,305,109 B1 | 10/2001 | Lee |
| 6,305,821 B1 | 10/2001 | Hsieh et al. |
| 6,307,331 B1 | 10/2001 | Bonasia et al. |
| 6,310,590 B1 | 10/2001 | Havel |
| 6,315,429 B1 | 11/2001 | Grandolfo |
| 6,323,832 B1 | 11/2001 | Nishizawa et al. |
| 6,325,651 B1 | 12/2001 | Nishihara et al. |
| 6,334,699 B1 | 1/2002 | Gladnick |
| 6,340,868 B1 | 1/2002 | Lys et al. |
| 6,354,714 B1 | 3/2002 | Rhodes |
| 6,361,186 B1 | 3/2002 | Slayden |
| 6,369,525 B1 | 4/2002 | Chang et al. |
| 6,371,637 B1 | 4/2002 | Atchinson et al. |
| 6,379,022 B1 | 4/2002 | Amerson et al. |
| D457,667 S | 5/2002 | Piepgras et al. |
| D457,669 S | 5/2002 | Piepgras et al. |
| D457,974 S | 5/2002 | Piepgras et al. |
| 6,388,393 B1 | 5/2002 | Illingworth |
| 6,394,623 B1 | 5/2002 | Tsui |
| D458,395 S | 6/2002 | Piepgras et al. |
| 6,400,096 B1 | 6/2002 | Wells et al. |
| 6,404,131 B1 | 6/2002 | Kawano et al. |
| 6,411,022 B1 | 6/2002 | Machida |
| 6,422,716 B2 | 7/2002 | Henrici et al. |
| 6,428,189 B1 | 8/2002 | Hochstein |
| D463,610 S | 9/2002 | Piepgras et al. |
| 6,445,139 B1 | 9/2002 | Marshall et al. |
| 6,448,550 B1 | 9/2002 | Nishimura |
| 6,448,716 B1 | 9/2002 | Hutchison |
| 6,459,919 B1 | 10/2002 | Lys et al. |
| 6,469,457 B2 | 10/2002 | Callahan |
| 6,471,388 B1 | 10/2002 | Marsh |
| 6,472,823 B2 | 10/2002 | Yen |
| 6,473,002 B1 | 10/2002 | Hutchison |
| D468,035 S | 12/2002 | Blanc et al. |
| 6,488,392 B1 | 12/2002 | Lu |
| 6,495,964 B1 | 12/2002 | Muthu et al. |
| 6,527,411 B1 | 3/2003 | Sayers |
| 6,528,954 B1 | 3/2003 | Lys et al. |
| 6,528,958 B2 | 3/2003 | Hulshof et al. |
| 6,538,375 B1 | 3/2003 | Duggal et al. |
| 6,548,967 B1 | 4/2003 | Dowling et al. |
| 6,568,834 B1 | 5/2003 | Scianna |
| 6,573,536 B1 | 6/2003 | Dry |
| 6,577,072 B2 | 6/2003 | Saito et al. |
| 6,577,080 B2 | 6/2003 | Lys et al. |
| 6,577,512 B2 | 6/2003 | Tripathi et al. |
| 6,577,794 B1 | 6/2003 | Currie et al. |
| 6,578,979 B2 | 6/2003 | Truttmann-Battig |
| 6,582,103 B1 | 6/2003 | Popovich et al. |
| 6,583,550 B2 | 6/2003 | Iwasa et al. |
| 6,583,573 B2 | 6/2003 | Bierman |
| 6,585,393 B1 | 7/2003 | Brandes et al. |
| 6,586,890 B2 | 7/2003 | Min et al. |
| 6,590,343 B2 | 7/2003 | Pederson |
| 6,592,238 B2 | 7/2003 | Cleaver et al. |
| 6,596,977 B2 | 7/2003 | Muthu et al. |
| 6,598,996 B1 | 7/2003 | Lodhie |
| 6,608,453 B2 | 8/2003 | Morgan et al. |
| 6,608,614 B1 | 8/2003 | Johnson |
| 6,609,804 B2 | 8/2003 | Nolan et al. |
| 6,612,712 B2 | 9/2003 | Nepil |
| 6,612,717 B2 | 9/2003 | Yen |
| 6,621,222 B1 | 9/2003 | Hong |
| 6,623,151 B2 | 9/2003 | Pederson |
| 6,624,597 B2 | 9/2003 | Dowling et al. |
| D481,484 S | 10/2003 | Cuevas et al. |
| 6,634,770 B2 | 10/2003 | Cao |
| 6,634,779 B2 | 10/2003 | Reed |
| 6,636,003 B2 | 10/2003 | Rahm et al. |
| 6,639,349 B1 | 10/2003 | Bahadur |
| 6,641,284 B2 | 11/2003 | Stopa et al. |
| 6,659,622 B2 | 12/2003 | Katogi et al. |
| 6,660,935 B2 | 12/2003 | Southard et al. |
| 6,666,689 B1 | 12/2003 | Savage, Jr. |
| 6,667,623 B2 | 12/2003 | Bourgault et al. |
| 6,674,096 B2 | 1/2004 | Sommers |
| 6,676,284 B1 | 1/2004 | Willson |
| 6,679,621 B2 | 1/2004 | West et al. |
| 6,681,154 B2 | 1/2004 | Nierlich et al. |
| 6,682,205 B2 | 1/2004 | Lin |
| 6,683,419 B2 | 1/2004 | Kriparos |
| 6,700,136 B2 | 3/2004 | Guida |
| 6,712,486 B1 | 3/2004 | Popovich et al. |
| 6,717,376 B2 | 4/2004 | Lys et al. |
| 6,717,526 B2 | 4/2004 | Martineau et al. |
| 6,720,745 B2 | 4/2004 | Lys et al. |
| 6,726,348 B2 | 4/2004 | Gloisten |
| 6,741,324 B1 | 5/2004 | Kim |
| D491,678 S | 6/2004 | Piepgras |
| D492,042 S | 6/2004 | Piepgras |
| 6,744,223 B2 | 6/2004 | Laflamme et al. |
| 6,748,299 B1 | 6/2004 | Motoyama |
| 6,762,562 B2 | 7/2004 | Leong |
| 6,774,584 B2 | 8/2004 | Lys et al. |
| 6,777,891 B2 | 8/2004 | Lys et al. |
| 6,781,329 B2 | 8/2004 | Mueller et al. |
| 6,787,999 B2 | 9/2004 | Stimac et al. |
| 6,788,000 B2 | 9/2004 | Appelberg et al. |
| 6,788,011 B2 | 9/2004 | Mueller et al. |
| 6,791,840 B2 | 9/2004 | Chun |
| 6,796,680 B1 | 9/2004 | Showers et al. |
| 6,801,003 B2 | 10/2004 | Schanberger et al. |
| 6,803,732 B2 | 10/2004 | Kraus et al. |
| 6,806,659 B1 | 10/2004 | Mueller et al. |
| 6,814,470 B2 | 11/2004 | Rizkin et al. |
| 6,815,724 B2 | 11/2004 | Dry |
| 6,846,094 B2 | 1/2005 | Luk |
| 6,851,816 B2 | 2/2005 | Wu et al. |
| 6,851,832 B2 | 2/2005 | Tieszen |
| 6,853,150 B2 | 2/2005 | Clauberg et al. |
| 6,853,151 B2 | 2/2005 | Leong et al. |
| 6,853,563 B1 | 2/2005 | Yang et al. |
| 6,857,924 B2 | 2/2005 | Fu et al. |
| 6,860,628 B2 | 3/2005 | Robertson et al. |
| 6,866,401 B2 | 3/2005 | Sommers et al. |
| 6,869,204 B2 | 3/2005 | Morgan et al. |
| 6,871,981 B2 | 3/2005 | Alexanderson et al. |
| 6,874,924 B1 | 4/2005 | Hulse et al. |
| 6,879,883 B1 | 4/2005 | Motoyama |
| 6,882,111 B2 | 4/2005 | Kan et al. |
| 6,883,929 B2 | 4/2005 | Dowling |
| 6,883,934 B2 | 4/2005 | Kawakami et al. |
| 6,888,322 B2 | 5/2005 | Dowling et al. |
| 6,897,624 B2 | 5/2005 | Lys et al. |
| 6,909,239 B2 | 6/2005 | Gauna |
| 6,909,921 B1 | 6/2005 | Bilger |
| 6,918,680 B2 | 7/2005 | Seeberger |
| 6,921,181 B2 | 7/2005 | Yen |
| 6,936,968 B2 | 8/2005 | Cross et al. |
| 6,936,978 B2 | 8/2005 | Morgan et al. |
| 6,940,230 B2 | 9/2005 | Myron et al. |
| 6,948,829 B2 | 9/2005 | Verdes et al. |
| 6,957,905 B1 | 10/2005 | Pritchard et al. |
| 6,963,175 B2 | 11/2005 | Archenhold et al. |
| 6,964,501 B2 | 11/2005 | Ryan |
| 6,965,197 B2 | 11/2005 | Tyan et al. |
| 6,965,205 B2 | 11/2005 | Piepgras et al. |
| 6,967,448 B2 | 11/2005 | Morgan et al. |
| 6,969,179 B2 | 11/2005 | Sloan et al. |
| 6,969,186 B2 | 11/2005 | Sonderegger et al. |
| 6,969,954 B2 | 11/2005 | Lys |
| 6,975,079 B2 | 12/2005 | Lys et al. |
| 6,979,097 B2 | 12/2005 | Elam et al. |

| | | | | | | |
|---|---|---|---|---|---|---|
| 6,982,518 | B2 | 1/2006 | Chou et al. | 7,217,012 | B2 | 5/2007 | Southard et al. |
| 6,995,681 | B2 | 2/2006 | Pederson | 7,217,022 | B2 | 5/2007 | Ruffin |
| 6,997,576 | B1 | 2/2006 | Lodhie et al. | 7,218,056 | B1 | 5/2007 | Harwood |
| 7,004,603 | B2 | 2/2006 | Knight | 7,218,238 | B2 | 5/2007 | Right et al. |
| D518,218 | S | 3/2006 | Roberge et al. | 7,220,015 | B2 | 5/2007 | Dowling |
| 7,008,079 | B2 | 3/2006 | Smith | 7,220,018 | B2 | 5/2007 | Crabb et al. |
| 7,014,336 | B1 | 3/2006 | Ducharme et al. | 7,221,104 | B2 | 5/2007 | Lys et al. |
| 7,015,650 | B2 | 3/2006 | McGrath | 7,221,110 | B2 | 5/2007 | Sears et al. |
| 7,018,063 | B2 | 3/2006 | Michael et al. | 7,224,000 | B2 | 5/2007 | Aanegola et al. |
| 7,021,799 | B2 | 4/2006 | Mizuyoshi | 7,226,189 | B2 | 6/2007 | Lee et al. |
| 7,021,809 | B2 | 4/2006 | Iwasa et al. | 7,228,052 | B1 | 6/2007 | Lin |
| 7,024,256 | B2 | 4/2006 | Krzyzanowski et al. | 7,228,190 | B2 | 6/2007 | Dowling et al. |
| 7,031,920 | B2 | 4/2006 | Dowling et al. | 7,231,060 | B2 | 6/2007 | Dowling et al. |
| 7,033,036 | B2 | 4/2006 | Pederson | 7,233,115 | B2 | 6/2007 | Lys |
| 7,038,398 | B1 | 5/2006 | Lys et al. | 7,233,831 | B2 | 6/2007 | Blackwell |
| 7,038,399 | B2 | 5/2006 | Lys et al. | 7,236,366 | B2 | 6/2007 | Chen |
| 7,042,172 | B2 | 5/2006 | Dowling et al. | 7,237,924 | B2 | 7/2007 | Martineau et al. |
| 7,048,423 | B2 | 5/2006 | Stepanenko et al. | 7,237,925 | B2 | 7/2007 | Mayer et al. |
| 7,049,761 | B2 | 5/2006 | Timmermans et al. | 7,239,532 | B1 | 7/2007 | Hsu et al. |
| 7,052,171 | B1 | 5/2006 | Lefebvre et al. | 7,241,038 | B2 | 7/2007 | Naniwa et al. |
| 7,053,557 | B2 | 5/2006 | Cross et al. | 7,242,152 | B2 | 7/2007 | Dowling et al. |
| 7,064,498 | B2 | 6/2006 | Dowling et al. | 7,246,926 | B2 | 7/2007 | Harwood |
| 7,064,674 | B2 | 6/2006 | Pederson | 7,246,931 | B2 | 7/2007 | Hsieh et al. |
| 7,067,992 | B2 | 6/2006 | Leong et al. | 7,248,239 | B2 | 7/2007 | Dowling et al. |
| 7,077,978 | B2 | 7/2006 | Setlur et al. | 7,249,269 | B1 | 7/2007 | Motoyama |
| 7,080,927 | B2 | 7/2006 | Feuerborn et al. | 7,249,865 | B2 | 7/2007 | Robertson |
| 7,086,747 | B2 | 8/2006 | Nielson et al. | D548,868 | S | 8/2007 | Roberge et al. |
| 7,088,014 | B2 | 8/2006 | Nierlich et al. | 7,252,408 | B2 | 8/2007 | Mazzochette et al. |
| 7,088,904 | B2 | 8/2006 | Ryan, Jr. | 7,253,566 | B2 | 8/2007 | Lys et al. |
| 7,102,902 | B1 | 9/2006 | Brown et al. | 7,255,457 | B2 | 8/2007 | Ducharme et al. |
| 7,113,541 | B1 | 9/2006 | Lys et al. | 7,255,460 | B2 | 8/2007 | Lee |
| 7,114,830 | B2 | 10/2006 | Robertson et al. | 7,256,554 | B2 | 8/2007 | Lys |
| 7,114,834 | B2 | 10/2006 | Rivas et al. | 7,258,458 | B2 | 8/2007 | Mochiachvili et al. |
| 7,118,262 | B2 | 10/2006 | Negley | 7,258,467 | B2 | 8/2007 | Saccomanno et al. |
| 7,119,503 | B2 | 10/2006 | Kemper | 7,259,528 | B2 | 8/2007 | Pilz |
| 7,121,679 | B2 | 10/2006 | Fujimoto | 7,262,439 | B2 | 8/2007 | Setlur et al. |
| 7,122,976 | B1 | 10/2006 | Null et al. | 7,264,372 | B2 | 9/2007 | Maglica |
| 7,128,442 | B2 | 10/2006 | Lee et al. | 7,267,467 | B2 | 9/2007 | Wu et al. |
| 7,128,454 | B2 | 10/2006 | Kim et al. | 7,270,443 | B2 | 9/2007 | Kurtz et al. |
| D532,532 | S | 11/2006 | Maxik | 7,271,794 | B1 | 9/2007 | Cheng et al. |
| 7,132,635 | B2 | 11/2006 | Dowling | 7,273,300 | B2 | 9/2007 | Mrakovich |
| 7,132,785 | B2 | 11/2006 | Ducharme | 7,274,045 | B2 | 9/2007 | Chandran et al. |
| 7,132,804 | B2 | 11/2006 | Lys et al. | 7,274,160 | B2 | 9/2007 | Mueller et al. |
| 7,135,824 | B2 | 11/2006 | Lys et al. | D553,267 | S | 10/2007 | Yuen |
| 7,139,617 | B1 | 11/2006 | Morgan et al. | 7,285,801 | B2 | 10/2007 | Eliashevich et al. |
| 7,144,135 | B2 | 12/2006 | Martin et al. | 7,288,902 | B1 | 10/2007 | Melanson |
| 7,153,002 | B2 | 12/2006 | Kim et al. | 7,296,912 | B2 | 11/2007 | Beauchamp |
| 7,161,311 | B2 | 1/2007 | Mueller et al. | 7,300,184 | B2 | 11/2007 | Ichikawa et al. |
| 7,161,313 | B2 | 1/2007 | Piepgras et al. | 7,300,192 | B2 | 11/2007 | Mueller et al. |
| 7,161,556 | B2 | 1/2007 | Morgan et al. | D556,937 | S | 12/2007 | Ly |
| 7,164,110 | B2 | 1/2007 | Pitigoi-Aron et al. | D557,854 | S | 12/2007 | Lewis |
| 7,164,235 | B2 | 1/2007 | Ito et al. | 7,303,300 | B2 | 12/2007 | Dowling et al. |
| 7,165,863 | B1 | 1/2007 | Thomas et al. | 7,306,353 | B2 | 12/2007 | Popovich et al. |
| 7,165,866 | B2 | 1/2007 | Li | 7,307,391 | B2 | 12/2007 | Shan |
| 7,167,777 | B2 | 1/2007 | Budike, Jr. | 7,308,296 | B2 | 12/2007 | Lys et al. |
| 7,168,843 | B2 | 1/2007 | Striebel | 7,309,965 | B2 | 12/2007 | Dowling et al. |
| D536,468 | S | 2/2007 | Crosby | 7,318,658 | B2 | 1/2008 | Wang et al. |
| 7,178,941 | B2 | 2/2007 | Roberge et al. | 7,319,244 | B2 | 1/2008 | Liu et al. |
| 7,180,252 | B2 | 2/2007 | Lys et al. | 7,319,246 | B2 | 1/2008 | Soules et al. |
| D538,950 | S | 3/2007 | Maxik | 7,321,191 | B2 | 1/2008 | Setlur et al. |
| D538,952 | S | 3/2007 | Maxik et al. | 7,326,964 | B2 | 2/2008 | Lim et al. |
| D538,962 | S | 3/2007 | Elliott | 7,327,281 | B2 | 2/2008 | Hutchison |
| 7,186,003 | B2 | 3/2007 | Dowling et al. | 7,329,031 | B2 | 2/2008 | Liaw et al. |
| 7,186,005 | B2 | 3/2007 | Hulse | D563,589 | S | 3/2008 | Hariri et al. |
| 7,187,141 | B2 | 3/2007 | Mueller et al. | 7,345,320 | B2 | 3/2008 | Dahm |
| 7,190,126 | B1 | 3/2007 | Paton | 7,348,604 | B2 | 3/2008 | Matheson |
| 7,192,154 | B2 | 3/2007 | Becker | 7,350,936 | B2 | 4/2008 | Ducharme et al. |
| 7,198,387 | B1 | 4/2007 | Gloisten et al. | 7,350,952 | B2 | 4/2008 | Nishigaki |
| 7,201,491 | B2 | 4/2007 | Bayat et al. | 7,352,138 | B2 | 4/2008 | Lys et al. |
| 7,201,497 | B2 | 4/2007 | Weaver, Jr. et al. | 7,352,339 | B2 | 4/2008 | Morgan et al. |
| 7,202,613 | B2 | 4/2007 | Morgan et al. | 7,353,071 | B2 | 4/2008 | Blackwell et al. |
| 7,204,615 | B2 | 4/2007 | Arik et al. | 7,358,679 | B2 | 4/2008 | Lys et al. |
| 7,204,622 | B2 | 4/2007 | Dowling et al. | 7,358,929 | B2 | 4/2008 | Mueller et al. |
| 7,207,696 | B1 | 4/2007 | Lin | 7,374,327 | B2 | 5/2008 | Schexnaider |
| 7,210,818 | B2 | 5/2007 | Luk et al. | 7,385,359 | B2 | 6/2008 | Dowling et al. |
| 7,210,957 | B2 | 5/2007 | Mrakovich et al. | 7,391,159 | B2 | 6/2008 | Harwood |
| 7,211,959 | B1 | 5/2007 | Chou | 7,396,146 | B2 | 7/2008 | Wang |
| 7,213,934 | B2 | 5/2007 | Zarian et al. | 7,401,935 | B2 | 7/2008 | VanderSchuit |
| 7,217,004 | B2 | 5/2007 | Park et al. | 7,401,945 | B2 | 7/2008 | Zhang |

| | | |
|---|---|---|
| 7,427,840 B2 | 9/2008 | Morgan et al. |
| 7,429,117 B2 | 9/2008 | Pohlert et al. |
| 7,434,964 B1 | 10/2008 | Zheng et al. |
| 7,438,441 B2 | 10/2008 | Sun et al. |
| D580,089 S | 11/2008 | Ly et al. |
| D581,556 S | 11/2008 | To et al. |
| 7,449,847 B2 | 11/2008 | Schanberger et al. |
| D582,577 S | 12/2008 | Yuen |
| D584,428 S | 1/2009 | Li et al. |
| 7,476,002 B2 | 1/2009 | Wolf et al. |
| 7,476,004 B2 | 1/2009 | Chan |
| 7,478,924 B2 | 1/2009 | Robertson |
| D586,484 S | 2/2009 | Liu et al. |
| D586,928 S | 2/2009 | Liu et al. |
| 7,490,957 B2 | 2/2009 | Leong et al. |
| 7,497,596 B2 | 3/2009 | Ge |
| 7,507,001 B2 | 3/2009 | Kit |
| 7,510,299 B2 | 3/2009 | Timmermans et al. |
| 7,520,635 B2 | 4/2009 | Wolf et al. |
| 7,521,872 B2 | 4/2009 | Bruning |
| 7,524,089 B2 | 4/2009 | Park |
| D593,223 S | 5/2009 | Komar |
| 7,534,002 B2 | 5/2009 | Yamaguchi et al. |
| 7,549,769 B2 | 6/2009 | Kim et al. |
| 7,556,396 B2 | 7/2009 | Kuo et al. |
| 7,572,030 B2 | 8/2009 | Booth et al. |
| 7,575,339 B2 | 8/2009 | Hung |
| 7,579,786 B2 | 8/2009 | Soos |
| 7,583,035 B2 | 9/2009 | Shteynberg et al. |
| 7,602,559 B2 | 10/2009 | Jang et al. |
| 7,619,366 B2 | 11/2009 | Diederiks |
| 7,635,201 B2 | 12/2009 | Deng |
| 7,639,517 B2 | 12/2009 | Zhou et al. |
| D612,528 S | 3/2010 | McGrath et al. |
| 7,690,813 B2 | 4/2010 | Kanamori et al. |
| 7,710,047 B2 | 5/2010 | Shteynberg et al. |
| 7,712,918 B2 | 5/2010 | Siemiet et al. |
| 7,828,471 B2 | 11/2010 | Lin |
| 7,843,150 B2 | 11/2010 | Wang et al. |
| 2001/0033488 A1 | 10/2001 | Chliwnyj et al. |
| 2001/0045803 A1 | 11/2001 | Cencur |
| 2002/0038157 A1 | 3/2002 | Dowling et al. |
| 2002/0044066 A1 | 4/2002 | Dowling et al. |
| 2002/0047569 A1 | 4/2002 | Dowling et al. |
| 2002/0047624 A1 | 4/2002 | Stam et al. |
| 2002/0047628 A1 | 4/2002 | Morgan et al. |
| 2002/0048169 A1 | 4/2002 | Dowling et al. |
| 2002/0057061 A1 | 5/2002 | Mueller et al. |
| 2002/0060526 A1 | 5/2002 | Timmermans et al. |
| 2002/0070688 A1 | 6/2002 | Dowling et al. |
| 2002/0074559 A1 | 6/2002 | Dowling et al. |
| 2002/0078221 A1 | 6/2002 | Blackwell et al. |
| 2002/0101197 A1 | 8/2002 | Lys et al. |
| 2002/0113555 A1 | 8/2002 | Lys et al. |
| 2002/0130627 A1 | 9/2002 | Morgan et al. |
| 2002/0145394 A1 | 10/2002 | Morgan et al. |
| 2002/0145869 A1 | 10/2002 | Dowling |
| 2002/0152045 A1 | 10/2002 | Dowling et al. |
| 2002/0152298 A1 | 10/2002 | Kikta et al. |
| 2002/0153851 A1 | 10/2002 | Morgan et al. |
| 2002/0158583 A1 | 10/2002 | Lys et al. |
| 2002/0163316 A1 | 11/2002 | Lys et al. |
| 2002/0171365 A1 | 11/2002 | Morgan et al. |
| 2002/0171377 A1 | 11/2002 | Mueller et al. |
| 2002/0171378 A1 | 11/2002 | Morgan et al. |
| 2002/0176259 A1 | 11/2002 | Ducharme |
| 2002/0179816 A1 | 12/2002 | Haines et al. |
| 2002/0195975 A1 | 12/2002 | Schanberger et al. |
| 2003/0011538 A1 | 1/2003 | Lys et al. |
| 2003/0028260 A1 | 2/2003 | Blackwell |
| 2003/0031015 A1 | 2/2003 | Ishibashi |
| 2003/0057884 A1 | 3/2003 | Dowling et al. |
| 2003/0057886 A1 | 3/2003 | Lys et al. |
| 2003/0057887 A1 | 3/2003 | Dowling et al. |
| 2003/0057890 A1 | 3/2003 | Lys et al. |
| 2003/0076281 A1 | 4/2003 | Morgan et al. |
| 2003/0085710 A1 | 5/2003 | Bourgault et al. |
| 2003/0095404 A1 | 5/2003 | Becks et al. |
| 2003/0100837 A1 | 5/2003 | Lys et al. |
| 2003/0102810 A1 | 6/2003 | Cross et al. |
| 2003/0133292 A1 | 7/2003 | Mueller et al. |
| 2003/0137258 A1 | 7/2003 | Piepgras et al. |
| 2003/0185005 A1 | 10/2003 | Sommers et al. |
| 2003/0185014 A1 | 10/2003 | Gloisten |
| 2003/0189412 A1 | 10/2003 | Cunningham |
| 2003/0222587 A1 | 12/2003 | Dowling, Jr. et al. |
| 2004/0003545 A1 | 1/2004 | Gillespie |
| 2004/0012959 A1 | 1/2004 | Robertson et al. |
| 2004/0036006 A1 | 2/2004 | Dowling |
| 2004/0037088 A1 | 2/2004 | English et al. |
| 2004/0052076 A1 | 3/2004 | Mueller et al. |
| 2004/0062041 A1 | 4/2004 | Cross et al. |
| 2004/0075572 A1 | 4/2004 | Buschmann et al. |
| 2004/0080960 A1 | 4/2004 | Wu |
| 2004/0090191 A1 | 5/2004 | Mueller et al. |
| 2004/0090787 A1 | 5/2004 | Dowling et al. |
| 2004/0105261 A1 | 6/2004 | Ducharme et al. |
| 2004/0105264 A1 | 6/2004 | Spero |
| 2004/0113568 A1 | 6/2004 | Dowling et al. |
| 2004/0116039 A1 | 6/2004 | Mueller et al. |
| 2004/0124782 A1 | 7/2004 | Yu |
| 2004/0130909 A1 | 7/2004 | Mueller et al. |
| 2004/0141321 A1 | 7/2004 | Dowling et al. |
| 2004/0155609 A1 | 8/2004 | Lys et al. |
| 2004/0160199 A1 | 8/2004 | Morgan et al. |
| 2004/0178751 A1 | 9/2004 | Mueller et al. |
| 2004/0189218 A1 | 9/2004 | Leong et al. |
| 2004/0189262 A1 | 9/2004 | McGrath |
| 2004/0212320 A1 | 10/2004 | Dowling et al. |
| 2004/0212321 A1 | 10/2004 | Lys et al. |
| 2004/0212993 A1 | 10/2004 | Morgan et al. |
| 2004/0223328 A1 | 11/2004 | Lee et al. |
| 2004/0240002 A1 | 12/2004 | Lys et al. |
| 2004/0257007 A1 | 12/2004 | Lys et al. |
| 2005/0013133 A1 | 1/2005 | Yeh |
| 2005/0024877 A1 | 2/2005 | Frederick |
| 2005/0030744 A1 | 2/2005 | Ducharme et al. |
| 2005/0035728 A1 | 2/2005 | Schanberger et al. |
| 2005/0036300 A1 | 2/2005 | Dowling et al. |
| 2005/0040774 A1 | 2/2005 | Mueller et al. |
| 2005/0041161 A1 | 2/2005 | Dowling et al. |
| 2005/0041424 A1 | 2/2005 | Ducharme |
| 2005/0043907 A1 | 2/2005 | Eckel et al. |
| 2005/0044617 A1 | 3/2005 | Mueller et al. |
| 2005/0047132 A1 | 3/2005 | Dowling et al. |
| 2005/0047134 A1 | 3/2005 | Mueller et al. |
| 2005/0062440 A1 | 3/2005 | Lys et al. |
| 2005/0063194 A1 | 3/2005 | Lys et al. |
| 2005/0078477 A1 | 4/2005 | Lo |
| 2005/0099824 A1 | 5/2005 | Dowling et al. |
| 2005/0107694 A1 | 5/2005 | Jansen et al. |
| 2005/0110384 A1 | 5/2005 | Peterson |
| 2005/0116667 A1 | 6/2005 | Mueller et al. |
| 2005/0128751 A1 | 6/2005 | Roberge et al. |
| 2005/0141225 A1 | 6/2005 | Striebel |
| 2005/0151489 A1 | 7/2005 | Lys et al. |
| 2005/0151663 A1 | 7/2005 | Tanguay |
| 2005/0154494 A1 | 7/2005 | Ahmed |
| 2005/0174473 A1 | 8/2005 | Morgan et al. |
| 2005/0174780 A1 | 8/2005 | Park |
| 2005/0184667 A1 | 8/2005 | Sturman et al. |
| 2005/0201112 A1 | 9/2005 | Machi et al. |
| 2005/0206529 A1 | 9/2005 | St.-Germain |
| 2005/0213320 A1 | 9/2005 | Kazuhiro et al. |
| 2005/0213352 A1 | 9/2005 | Lys |
| 2005/0213353 A1 | 9/2005 | Lys |
| 2005/0218838 A1 | 10/2005 | Lys |
| 2005/0218870 A1 | 10/2005 | Lys |
| 2005/0219860 A1 | 10/2005 | Schexnaider |
| 2005/0219872 A1 | 10/2005 | Lys |
| 2005/0225979 A1 | 10/2005 | Robertson et al. |
| 2005/0231133 A1 | 10/2005 | Lys |
| 2005/0236029 A1 | 10/2005 | Dowling |
| 2005/0236998 A1 | 10/2005 | Mueller et al. |
| 2005/0248299 A1 | 11/2005 | Chemel et al. |
| 2005/0253533 A1 | 11/2005 | Lys et al. |
| 2005/0259424 A1 | 11/2005 | Zampini, II et al. |
| 2005/0265019 A1 | 12/2005 | Sommers et al. |

| | | |
|---|---|---|
| 2005/0275626 A1 | 12/2005 | Mueller et al. |
| 2005/0276051 A1 | 12/2005 | Caudle et al. |
| 2005/0276053 A1 | 12/2005 | Nortrup et al. |
| 2005/0276064 A1 | 12/2005 | Wu et al. |
| 2005/0285547 A1 | 12/2005 | Piepgras et al. |
| 2006/0002110 A1 | 1/2006 | Dowling et al. |
| 2006/0012987 A9 | 1/2006 | Ducharme et al. |
| 2006/0012997 A1 | 1/2006 | Catalano et al. |
| 2006/0016960 A1 | 1/2006 | Morgan et al. |
| 2006/0022214 A1 | 2/2006 | Morgan et al. |
| 2006/0028155 A1 | 2/2006 | Young |
| 2006/0028837 A1 | 2/2006 | Mrakovich |
| 2006/0034078 A1 | 2/2006 | Kovacik et al. |
| 2006/0050509 A9 | 3/2006 | Dowling et al. |
| 2006/0050514 A1 | 3/2006 | Opolka |
| 2006/0076908 A1 | 4/2006 | Morgan et al. |
| 2006/0092640 A1 | 5/2006 | Li |
| 2006/0098077 A1 | 5/2006 | Dowling |
| 2006/0104058 A1 | 5/2006 | Chemel et al. |
| 2006/0109648 A1 | 5/2006 | Trenchard et al. |
| 2006/0109649 A1 | 5/2006 | Ducharme et al. |
| 2006/0109661 A1 | 5/2006 | Coushaine et al. |
| 2006/0126325 A1 | 6/2006 | Lefebvre et al. |
| 2006/0126338 A1 | 6/2006 | Mighetto |
| 2006/0132061 A1 | 6/2006 | McCormick et al. |
| 2006/0132323 A1 | 6/2006 | Grady, Jr. |
| 2006/0146531 A1 | 7/2006 | Reo et al. |
| 2006/0152172 A9 | 7/2006 | Mueller et al. |
| 2006/0158881 A1 | 7/2006 | Dowling |
| 2006/0170376 A1 | 8/2006 | Piepgras et al. |
| 2006/0192502 A1 | 8/2006 | Brown et al. |
| 2006/0193131 A1 | 8/2006 | McGrath et al. |
| 2006/0197661 A1 | 9/2006 | Tracy et al. |
| 2006/0198128 A1 | 9/2006 | Piepgras et al. |
| 2006/0208667 A1 | 9/2006 | Lys et al. |
| 2006/0221606 A1 | 10/2006 | Dowling et al. |
| 2006/0221619 A1 | 10/2006 | Nishigaki |
| 2006/0232974 A1 | 10/2006 | Lee et al. |
| 2006/0262516 A9 | 11/2006 | Dowling et al. |
| 2006/0262521 A1 | 11/2006 | Piepgras et al. |
| 2006/0262544 A1 | 11/2006 | Piepgras et al. |
| 2006/0262545 A1 | 11/2006 | Piepgras et al. |
| 2006/0273741 A1 | 12/2006 | Stalker, III |
| 2006/0274529 A1 | 12/2006 | Cao |
| 2006/0285325 A1 | 12/2006 | Ducharme et al. |
| 2007/0035255 A1 | 2/2007 | Shuster et al. |
| 2007/0040516 A1 | 2/2007 | Chen |
| 2007/0041220 A1 | 2/2007 | Lynch |
| 2007/0047227 A1 | 3/2007 | Ducharme |
| 2007/0053182 A1 | 3/2007 | Robertson |
| 2007/0053208 A1 | 3/2007 | Justel et al. |
| 2007/0064419 A1 | 3/2007 | Gandhi |
| 2007/0070621 A1 | 3/2007 | Rivas et al. |
| 2007/0070631 A1 | 3/2007 | Huang et al. |
| 2007/0081423 A1 | 4/2007 | Chien |
| 2007/0086754 A1 | 4/2007 | Lys et al. |
| 2007/0086912 A1 | 4/2007 | Dowling et al. |
| 2007/0097678 A1 | 5/2007 | Yang |
| 2007/0109763 A1 | 5/2007 | Wolf et al. |
| 2007/0115658 A1 | 5/2007 | Mueller et al. |
| 2007/0115665 A1 | 5/2007 | Mueller et al. |
| 2007/0120594 A1 | 5/2007 | Balakrishnan et al. |
| 2007/0127234 A1 | 6/2007 | Jervey, III |
| 2007/0133202 A1 | 6/2007 | Huang et al. |
| 2007/0139938 A1 | 6/2007 | Petroski et al. |
| 2007/0145915 A1 | 6/2007 | Roberge et al. |
| 2007/0147046 A1 | 6/2007 | Arik et al. |
| 2007/0152797 A1 | 7/2007 | Chemel et al. |
| 2007/0153514 A1 | 7/2007 | Dowling et al. |
| 2007/0159828 A1 | 7/2007 | Wang |
| 2007/0165402 A1 | 7/2007 | Weaver, Jr. et al. |
| 2007/0165405 A1 | 7/2007 | Chen |
| 2007/0173978 A1 | 7/2007 | Fein et al. |
| 2007/0177382 A1 | 8/2007 | Pritchard et al. |
| 2007/0182387 A1 | 8/2007 | Weirich |
| 2007/0188114 A1 | 8/2007 | Lys et al. |
| 2007/0188427 A1 | 8/2007 | Lys et al. |
| 2007/0189026 A1 | 8/2007 | Chemel et al. |
| 2007/0195526 A1 | 8/2007 | Dowling et al. |
| 2007/0195527 A1 | 8/2007 | Russell |
| 2007/0195532 A1 | 8/2007 | Reisenauer et al. |
| 2007/0205712 A1 | 9/2007 | Radkov et al. |
| 2007/0206375 A1 | 9/2007 | Piepgras et al. |
| 2007/0211463 A1 | 9/2007 | Chevalier et al. |
| 2007/0228999 A1 | 10/2007 | Kit |
| 2007/0235751 A1 | 10/2007 | Radkov et al. |
| 2007/0236156 A1 | 10/2007 | Lys et al. |
| 2007/0237284 A1 | 10/2007 | Lys et al. |
| 2007/0240346 A1 | 10/2007 | Li et al. |
| 2007/0241657 A1 | 10/2007 | Radkov et al. |
| 2007/0242466 A1 | 10/2007 | Wu et al. |
| 2007/0247842 A1 | 10/2007 | Zampini et al. |
| 2007/0247847 A1 | 10/2007 | Villard |
| 2007/0247851 A1 | 10/2007 | Villard |
| 2007/0258231 A1 | 11/2007 | Koerner et al. |
| 2007/0258240 A1 | 11/2007 | Ducharme et al. |
| 2007/0263379 A1 | 11/2007 | Dowling |
| 2007/0274070 A1 | 11/2007 | Wedell |
| 2007/0281520 A1 | 12/2007 | Insalaco et al. |
| 2007/0285926 A1 | 12/2007 | Maxik |
| 2007/0285933 A1 | 12/2007 | Southard et al. |
| 2007/0290625 A1 | 12/2007 | He et al. |
| 2007/0291483 A1 | 12/2007 | Lys |
| 2007/0296350 A1 | 12/2007 | Maxik et al. |
| 2008/0003664 A1 | 1/2008 | Tysoe et al. |
| 2008/0007945 A1 | 1/2008 | Kelly et al. |
| 2008/0012502 A1 | 1/2008 | Lys |
| 2008/0012506 A1 | 1/2008 | Mueller et al. |
| 2008/0013316 A1 | 1/2008 | Chiang |
| 2008/0013324 A1 | 1/2008 | Yu |
| 2008/0018261 A1 | 1/2008 | Kastner |
| 2008/0037245 A1 | 2/2008 | Chan |
| 2008/0037284 A1 | 2/2008 | Rudisill |
| 2008/0062680 A1 | 3/2008 | Timmermans et al. |
| 2008/0089075 A1 | 4/2008 | Hsu |
| 2008/0092800 A1 | 4/2008 | Smith et al. |
| 2008/0093615 A1 | 4/2008 | Lin et al. |
| 2008/0093998 A1 | 4/2008 | Dennery et al. |
| 2008/0094837 A1 | 4/2008 | Dobbins et al. |
| 2008/0130267 A1 | 6/2008 | Dowling et al. |
| 2008/0151535 A1 | 6/2008 | de Castris |
| 2008/0158871 A1 | 7/2008 | McAvoy et al. |
| 2008/0158887 A1 | 7/2008 | Zhu et al. |
| 2008/0164826 A1 | 7/2008 | Lys |
| 2008/0164827 A1 | 7/2008 | Lys |
| 2008/0164854 A1 | 7/2008 | Lys |
| 2008/0175003 A1 | 7/2008 | Tsou et al. |
| 2008/0180036 A1 | 7/2008 | Garrity et al. |
| 2008/0186704 A1 | 8/2008 | Chou et al. |
| 2008/0192436 A1 | 8/2008 | Peng et al. |
| 2008/0211419 A1 | 9/2008 | Garrity |
| 2008/0224629 A1 | 9/2008 | Melanson |
| 2008/0224636 A1 | 9/2008 | Melanson |
| 2008/0253125 A1 | 10/2008 | Kang et al. |
| 2008/0258647 A1 | 10/2008 | Scianna |
| 2008/0285257 A1 | 11/2008 | King |
| 2008/0285266 A1 | 11/2008 | Thomas |
| 2008/0290814 A1 | 11/2008 | Leong et al. |
| 2008/0291675 A1 | 11/2008 | Lin et al. |
| 2008/0315773 A1 | 12/2008 | Pang |
| 2008/0315784 A1 | 12/2008 | Tseng |
| 2009/0002995 A1 | 1/2009 | Lee et al. |
| 2009/0016063 A1 | 1/2009 | Hu |
| 2009/0046473 A1 | 2/2009 | Tsai et al. |
| 2009/0052186 A1 | 2/2009 | Xue |
| 2009/0067182 A1 | 3/2009 | Hsu et al. |
| 2009/0086492 A1 | 4/2009 | Meyer |
| 2009/0091938 A1 | 4/2009 | Jacobson et al. |
| 2009/0140285 A1 | 6/2009 | Lin et al. |
| 2009/0175041 A1 | 7/2009 | Yuen et al. |
| 2009/0185373 A1 | 7/2009 | Grajcar |
| 2009/0195186 A1 | 8/2009 | Guest et al. |
| 2009/0196034 A1 | 8/2009 | Gherardini et al. |
| 2009/0213588 A1 | 8/2009 | Manes |
| 2009/0273926 A1 | 11/2009 | Deng |
| 2009/0303720 A1 | 12/2009 | McGrath |
| 2009/0316408 A1 | 12/2009 | Villard |
| 2010/0008085 A1 | 1/2010 | Ivey et al. |

| | | | |
|---|---|---|---|
| 2010/0019689 A1 | 1/2010 | Shan | |
| 2010/0027259 A1 | 2/2010 | Simon et al. | |
| 2010/0033095 A1 | 2/2010 | Sadwick | |
| 2010/0033964 A1 | 2/2010 | Choi et al. | |
| 2010/0096998 A1 | 4/2010 | Beers | |
| 2010/0109550 A1 | 5/2010 | Huda et al. | |
| 2010/0109558 A1 | 5/2010 | Chew | |

FOREIGN PATENT DOCUMENTS

| | | |
|---|---|---|
| CN | 2869556 Y | 2/2007 |
| EP | 0013782 B1 | 3/1983 |
| EP | 0091172 A2 | 10/1983 |
| EP | 0124924 B1 | 9/1987 |
| EP | 0174699 B1 | 11/1988 |
| EP | 0197602 B1 | 11/1990 |
| EP | 0214701 B1 | 3/1992 |
| EP | 0262713 B1 | 6/1992 |
| EP | 0203668 B1 | 2/1993 |
| EP | 0272749 B1 | 8/1993 |
| EP | 0337567 B1 | 11/1993 |
| EP | 0390262 B1 | 12/1993 |
| EP | 0359329 B1 | 3/1994 |
| EP | 0403011 B1 | 4/1994 |
| EP | 0632511 A2 | 1/1995 |
| EP | 0432848 B1 | 4/1995 |
| EP | 0403001 B1 | 8/1995 |
| EP | 0525876 B1 | 5/1996 |
| EP | 0714556 B1 | 1/1999 |
| EP | 0889283 A1 | 1/1999 |
| EP | 0458408 B1 | 9/1999 |
| EP | 0578302 B1 | 9/1999 |
| EP | 0723701 B1 | 1/2000 |
| EP | 0787419 B1 | 5/2001 |
| EP | 1195740 A2 | 4/2002 |
| EP | 1016062 B1 | 8/2002 |
| EP | 1195740 A3 | 1/2003 |
| EP | 1149510 B1 | 2/2003 |
| EP | 1056993 B1 | 3/2003 |
| EP | 0766436 B1 | 5/2003 |
| EP | 0924281 B1 | 5/2003 |
| EP | 0826167 B1 | 6/2003 |
| EP | 1147686 B1 | 1/2004 |
| EP | 1142452 B1 | 3/2004 |
| EP | 1145602 B1 | 3/2004 |
| EP | 1422975 A1 | 5/2004 |
| EP | 0890059 B1 | 6/2004 |
| EP | 1348319 B1 | 6/2005 |
| EP | 1037862 B1 | 7/2005 |
| EP | 1346609 B1 | 8/2005 |
| EP | 1321012 B1 | 12/2005 |
| EP | 1610593 A2 | 12/2005 |
| EP | 1415517 B1 | 5/2006 |
| EP | 1415518 B1 | 5/2006 |
| EP | 1438877 B1 | 5/2006 |
| EP | 1166604 B1 | 6/2006 |
| EP | 1479270 B1 | 7/2006 |
| EP | 1348318 B1 | 8/2006 |
| EP | 1399694 B1 | 8/2006 |
| EP | 1461980 B1 | 10/2006 |
| EP | 1110120 B1 | 4/2007 |
| EP | 1440604 B1 | 4/2007 |
| EP | 1047903 B1 | 6/2007 |
| EP | 1500307 B1 | 6/2007 |
| EP | 0922305 B1 | 8/2007 |
| EP | 0922306 B1 | 8/2007 |
| EP | 1194918 B1 | 8/2007 |
| EP | 1048085 B1 | 11/2007 |
| EP | 1763650 B1 | 12/2007 |
| EP | 1776722 B1 | 1/2008 |
| EP | 1873012 A1 | 1/2008 |
| EP | 1459599 B1 | 2/2008 |
| EP | 1887836 A2 | 2/2008 |
| EP | 1579733 B1 | 4/2008 |
| EP | 1145282 B1 | 7/2008 |
| EP | 1157428 B1 | 9/2008 |
| EP | 1337784 B1 | 6/2009 |
| FR | 2813115 A1 | 2/2002 |
| GB | 2215024 A | 9/1989 |
| GB | 2324901 A | 11/1998 |
| JP | 6-54103 U | 7/1994 |
| JP | H6-54103 | 7/1994 |
| JP | 7-249467 | 9/1995 |
| JP | 08-162677 | 6/1996 |
| JP | 11-135274 A | 5/1999 |
| JP | 2001-238272 A | 8/2001 |
| JP | 2002-141555 A | 5/2002 |
| JP | 3098271 U | 2/2004 |
| JP | 2004-335426 | 11/2004 |
| JP | 2005-158363 A | 6/2005 |
| JP | 2005-166617 A | 6/2005 |
| JP | 2005-347214 A | 12/2005 |
| JP | 2006-507641 A | 3/2006 |
| JP | 3139714 U | 2/2008 |
| JP | 2008-258124 A | 10/2008 |
| KR | 10-2004-0008244 A | 1/2004 |
| KR | 20-0430022 Y1 | 11/2006 |
| KR | 10-0781652 B1 | 12/2007 |
| TW | M337036 | 7/2008 |
| WO | 9906759 A1 | 2/1999 |
| WO | 99/10867 A1 | 3/1999 |
| WO | 99/31560 A2 | 6/1999 |
| WO | 9945312 A1 | 9/1999 |
| WO | 00/01067 A2 | 1/2000 |
| WO | 02/25842 A2 | 3/2002 |
| WO | 02/061330 A2 | 8/2002 |
| WO | 02/069306 A2 | 9/2002 |
| WO | 02/091805 A2 | 11/2002 |
| WO | 02/098182 A2 | 12/2002 |
| WO | 02/099780 A2 | 12/2002 |
| WO | 03/026358 A1 | 3/2003 |
| WO | 03/055273 A2 | 7/2003 |
| WO | 03/067934 A2 | 8/2003 |
| WO | 03/090890 A1 | 11/2003 |
| WO | 03/096761 A1 | 11/2003 |
| WO | 2004/021747 A2 | 3/2004 |
| WO | 2004/023850 A2 | 3/2004 |
| WO | 2004/032572 A2 | 4/2004 |
| WO | 2004/100624 A2 | 11/2004 |
| WO | 2005031860 | 4/2005 |
| WO | 2005/052751 A2 | 6/2005 |
| WO | 2005/060309 A2 | 6/2005 |
| WO | 2005/084339 A2 | 9/2005 |
| WO | 2005/089293 A2 | 9/2005 |
| WO | 2005/089309 A2 | 9/2005 |
| WO | 2006/023149 A2 | 3/2006 |
| WO | 2006044328 A1 | 4/2006 |
| WO | 2006056210 A1 | 6/2006 |
| WO | 2006/093889 A2 | 9/2006 |
| WO | 2006/127666 A2 | 11/2006 |
| WO | 2006/127785 A2 | 11/2006 |
| WO | 2006/133272 A2 | 12/2006 |
| WO | 2006137686 A1 | 12/2006 |
| WO | 2007/081674 A1 | 7/2007 |
| WO | 2007/094810 A2 | 8/2007 |
| WO | 2007090292 A1 | 8/2007 |
| WO | 9957945 A1 | 9/2009 |

OTHER PUBLICATIONS

Experiment Electronic Ballast. Electronic Ballast for Fluorescent Lamps [online], Revised Fall of 2007. [Retrieved on Sep. 1, 1997]. Retrieved from Virginia Tech Web Page using Internet <URL: http://www.ece.vt.edu/ece3354/labs/ballast.pdf.>.

Truck-Lite, LEDSelect—LED, Model 35, Clearance & Marker Lighting, [online], [retrieved on Jan. 13, 2000] Retrieved from Truck-Lite Web Page using Internet <URL: http://trucklite.com/leds14.html>.

Truck-Lite, LEDSelect—LED, Super 44, Stop, Turn & Tail Lighting, [online], [retrieved on Jan. 13, 2000] Retrieved from Truck-Lite Web Page using Internet <URL: http://trucklite.com/leds2.html>.

Truck-Lite, LEDSelect—LED, Model 45, Stop, Turn & Tail Lighting [online], [retrieved on Jan. 13, 2000] Retrieved from Truck-Lite Web Page using Internet <URL: http://trucklite.com/leds4.html>.

Telecite Products & Services—Display Options, [online], [retrieved on Jan. 13, 2000] Retrieved from Telecite Web page using Internet <URL: http://www.telecite.com/en/products/options en.htm>.

Traffic Signal Products—Transportation Products Group, [online],

[retrieved on Jan. 13, 2000] Retrieved from the Dialight Web Page using Internet <URL: http://www.dialight.com/trans.htm>.

LED Lights, Replacement LED lamps for any incandescent light, [online], [retrieved on Jan. 13, 2000] Retrieved from LED Lights Web Page using Internet <URL: http://www.ledlights.com/replac.htm>.

Ledtronics, Ledtronics Catalog, 1996, p. 10, Ledtronics, Torrance, California.

Piper. The Best Path to Efficiency. Building Operating Management, Trade Press Publishing Company May 2000 [online], [retrieved on Jan. 17, 2008]. Retrieved from Find Articles Web Page using Internet <URL:http://findarticles.com/p/articles/mi_qu3922/is_200005/ai_n8899499/>.

Henson, Keith. The Benefits of Building Systems Integration, Access Control & Security Systems Integration, Oct. 1, 2000, Penton Media. [online], [retrieved on Oct. 24, 2008] Retrieved from Security Solutions Web page using Internet <URL: http://securitysolutions.com/mag/security_benefits_building_systems/>.

Phason Electronic Control Systems, Light Level Controller (LLC) case study. Nov. 30, 2004. 3 pages, Phason Inc., Winnipeg, Manitoba, Canada.

Airport International. Fly High With Intelligent Airport Building and Security Solutions [online], [retrieved on Oct. 24, 2008]. Retrieved from Airport International web page using Internet <URL: http://www.airport-int.com/categories/airport-building-and-security-solutions/fly-high-with-intelligent-airport-building-and-security-solutions.html>.

D.N.A.-III, [online], [retrieved Mar. 10, 2009] Retrieved from the PLC Lighting Web Page using Internet <URL: http://www.plclighting.com/product_info.php?cPath=1&products_id=92>.

E20116-18 Larmes Collection, [online], [retrieved on Jul. 10, 2010] Retrieved from ET2 Contemporary Lighting using Internet <URL: http://www.et2online.com/proddetail.aspx?ItemID=E20116-18>.

E20112-22 Starburst Collection, [online], [retrieved on Jul. 10, 2010] Retrieved from ET2 Contemporary Lighting using Internet <URL: http://www.et2online.com/proddetail.aspx?ItemID=E20112-22>.

E20524-10 & E20525-10 Curva Collection, [online], [retrieved on Jul. 10, 2010] Retrieved from ET2 Contemporary Lighting using Internet <URL: http://www.et2online.com/proddetail.aspx?ItemID=E20524-10 & E20525-10>.

E22201-44 Esprit Collection, [online], [retrieved on Jul. 10, 2010] Retrieved from ET2 Contemporary Lighting using Internet <URL: http://www.et2online.com/proddetail.aspx?ItemID=E22201-44>.

E20743-09 Stealth Collection, [online], [retrieved on Jul. 10, 2010] Retrieved from ET2 Contemporary Lighting using Internet <URL: http://www.et2online.com/proddetail.aspx?ItemID=E20743-09>.

Spencer, Eugene. High Sales, Low Utilization. Green Intelligent Buildings, Feb. 1, 2007. [online]. Retrieved from Green Intelligent Buildings web page using Internet <URL: http://www.greenintelligentbuildings.com/CDA/IBT_Archive/BNP_GUID_9-5-2006_A_10000000000000056772>.

Sensor Switch, nLight Lighting Control System, [online], [retrieved on Jan. 11, 2008] Retrieved from Sensor Switch web page using Internet <URL: http://www.sensorswitch.com>.

Six Strategies, [online], [retrieved on Jan. 11, 2008] Retrieved from Encelium Technologies Inc. Web Page using Internet <URL: http://www.encelium.com/products/strategies.html>.

Lawrence Berkeley National Laboratory. Lighting Control System—Phase Cut Carrier. University of California, [online] [retrieved on Jan. 14, 2008] Retrieved from Lawrence Berkeley National Laboratory web page using Internet <URL: http://www.lbl.gov/tt/techs/lbnl1871.html>.

Best Practice Guide—Commercial Office Buildings—Central HVAC System. [online], [Retrieved on Jan. 17, 2008] Retrieved from Flex Your Power Organization web page using Internet <URL: http:l/www.fypower.org/bpg/module.html?b=offices&m+Central HVAC Systems&s=Contr...>.

Cornell University. Light Canopy—Cornell University Solar Decathlon, [online], [retrieved on Jan. 17, 2008] Retrieved from Cornell University web page using Internet <URL: http://cusd.cornell.edu/cusd/web/index.php/page/show/section/Design/page/controls>.

Written Opinion and International Search Report of the International Search Authority May 24, 2010 from the corresponding International Application No. PCT/US2009/060087 filed Oct. 9, 2009.

Extended European Search Report for related case EP09822425, mailed Aug. 22, 2012, 9 pgs.

END CAP SUBSTITUTE FOR LED-BASED TUBE REPLACEMENT LIGHT

CROSS-REFERENCE TO RELATED APPLICATIONS

This application claims priority to U.S. Provisional Patent Application Ser. No. 61/108,345, filed Oct. 24, 2008, which is hereby incorporated by reference in its entirety.

TECHNICAL FIELD

The present invention relates in general to LED replacements for fluorescent lights.

BACKGROUND

LED-based lights shaped to replace conventional fluorescent tubes have appeared in recent years. Typically, such lights include a hollow tube with two end caps, one at each longitudinal end of the tube. The end caps generally include molded plastic cup-shaped bodies that slide over the ends of the tube to secure the end caps to the tube. End caps can seal ends of the tube to prevent contaminants from interfering with operation of the light. Additionally, each end cap can include one or more pins for compatibility with standard fluorescent fixtures. For example, many end caps carry two pins for compatibility with fixtures designed to receive standard-sized tubes, such as T5, T8, or T12 tubes.

SUMMARY

Embodiments of a replacement light for a fluorescent tube usable in a fluorescent fixture are disclosed herein. In one such embodiment, the light includes a housing having a first end and a second end opposite the first end. A support structure is disposed within the housing. At least one LED is positioned within the housing and is arranged on the support structure. A first seal has at least one aperture and is disposed within the first end of the housing. The first seal is configured to conform to an inner circumference of the first end of the housing. At least one electrical connector extends through the at least one aperture is and connectable to the fluorescent fixture.

In another such embodiment, the light includes a housing having a first end and a second end opposite the first end. A support structure is disposed within the housing. At least one LED is positioned within the housing and arranged on the support structure. Sealing means for replacing a conventional end cap are disposed within the first end of the housing.

Embodiments of a method of manufacturing a seal for a fluorescent tube replacement light containing at least one LED are also disclosed herein. In one such embodiment, the method includes providing a housing having a first end and a second end opposite the first end. A hardenable material is introduced to at least the first end of the housing. The hardenable material is hardened such that it conforms to an inner circumference of the first end.

These and other embodiments will be described in additional detail hereinafter.

DESCRIPTION

Figure 1:
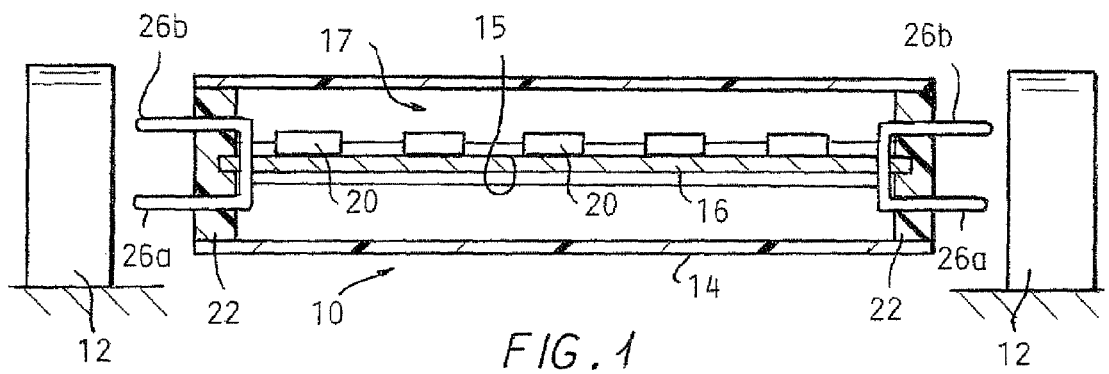
FIG. 1 is a cross-section of an example of a light tube according to one embodiment of the present invention.

Examples of LED-based lights including end cap replacing seals for use instead of plastic cup-shaped end caps and other types of end caps are discussed below with reference to FIGS. 1-4. FIG. 1 illustrates a light 10 sized for placement in a fixture 12 designed to receive standard-sized tubes. The fixture 12 can be, for example, of the type for accepting a T5, T8, T12 or any other suitable tube. Alternatively, the fixture 12 can be of the type for accepting another light, such as a halogen light or an incandescent bulb.

The light 10, as shown in FIG. 1, includes a tubular housing 14, a circuit board 16, multiple LEDs 20, and two end cap replacing seals 22. The tubular housing 14 defines a through-bore 17. The housing 14 can be made from polycarbonate, acrylic, glass or another light transmitting material (i.e., the housing 14 can be transparent or translucent). For example, a translucent housing 14 can be made from a composite, such as polycarbonate with particles of a light refracting material interspersed in the polycarbonate. While the illustrated housing 14 is cylindrical, housing having a square, triangular, polygonal, or other cross sectional shape can alternatively be used. Similarly, while the illustrated housing 14 is linear, housing having an alternative shape, e.g., a U-shape or a circular shape can alternatively be used. Additionally, the housing 14 need not be a single piece as shown in FIG. 1. Instead, another example of a housing can be formed by attaching multiple individual parts, not all of which need be light transmitting. For example, a housing formed by attaching multiple individual parts can include an opaque lower portion and a lens or other transparent cover attached to the lower portion to cover the LEDs 20. The housing 14 as shown in FIG. 1 can be manufactured to include light diffusing or refracting properties, such as by surface roughening or applying a diffusing film to the housing 14. For compatibility with the fixture 12 as discussed above, the housing 14 can have a length such that the light 10 is approximately 48" long, and the housing 14 can have a 0.625", 1.0", or 1.5" diameter. Of course, housing 14 can have other suitable dimensions. Additionally, the housing 14 can define a groove 15 for slidably receiving the circuit board 16.

The circuit board 16, as illustrated in FIG. 1, is an elongate printed circuit board. Multiple circuit board sections can be, for example, joined by bridge connectors to create the circuit board 16. The circuit board 16 is slidably engaged with the groove 15 of the housing 14, though the circuit board 16 can alternatively be clipped, adhered, snap- or friction-fit, screwed or otherwise connected to the housing 14. For example, the circuit board 16 can be mounted on a heat sink that is attached to the housing 14. As another example, the circuit board 16 can be secured by the seals 22 as is discussed below in greater detail. Also, other types of circuit boards may be used, such as a metal core circuit board. Or, instead of a circuit board 16, other types of electrical connections (e.g., wires) can be used to electrically connect the LEDs 20 to a power source. Additional electrical components, such as a rectifier and filter, can also be mounted on the circuit board 16.

The LEDs 20 can be surface-mount devices of a type available from Nichia, though other types of LEDs can alternatively be used. For example, although surface-mounted LEDs 20 are shown, one or more organic LEDs can be used in place of or in addition thereto. The LEDs 20 can be mounted to the circuit board 16 by solder, a snap-fit connection, or other means. The LEDs 20 can produce white light. However, LEDs that produce blue light, ultra-violet light or other wavelengths of light can be used in place of white light emitting LEDs 20.

The number of LEDs 20 can be a function of the desired power of the light 10 and the power of the LEDs 20. For a 48" light, such as the light 10, the number of LEDs 20 can vary from about five to four hundred such that the light 10 outputs approximately 500 to 3,000 lumens. However, a different number of LEDs 20 can alternatively be used, and the light 10 can output a different amount of lumens. The LEDs 20 can be evenly spaced along the circuit board 16, and the spacing of the LEDs 20 can be determined based on, for example, the light distribution of each LED 20 and the number of LEDs 20.

As shown in FIG. 1, the seals 22 can be positioned in opposing ends of the housing 14 (i.e., in opposing ends of the through-bore 17 defined by the housing 14). The seals 22 can be made from a variety of materials, such as an epoxy or other resin-based substance, rubber, cork, gel, concrete, glass, clay, wax, a polymer, silicone, or another material. The seals 22 can prevent the unintended entry of objects to the interior of the housing 14. The seals 22 can also perform additional functions as described below.

Each seal 22 can have a perimeter 22a shaped to conform to an inner circumference of the housing 14. As such, each seal 22 can have a perimeter 22a substantially identical to an inner circumference of the housing 14 such that the seal 22 can plug an end of the housing 14. For example, each seal 22 can be generally disc-shaped if the housing 14 is cylindrical. Alternatively, the seals 22 can be shaped to contact only portions of the inner circumference of the housing 14 when fit into ends of the housing 14. Thus, while the seals 22 can serve to prevent the unintended entry of an object to the interior of the housing 14, the seals 22 need not necessarily be air-tight or water-tight.

The thickness of the seals 22 (i.e., the distance that each seal 22 extends longitudinally from an end of the housing 14 toward a center of the housing 14) can be based on multiple factors. A large thickness can allow the seals 22 to strengthen the housing 14, can be more securely engaged with the housing 14, and/or can enhance the ability of the seals 22 to prevent unintended entry of an object to the interior of the housing 14. However, a seal 22 with a large thickness can require more material to produce, can be more difficult to install in the housing 14, and can limit the length of the housing 14 through which light can be produced. These factors, among others, can be considered to determine a proper seal shape. Additionally, the seals 22 can protrude from ends of the housing 14 (i.e., the seals 22 need not be fully contained within the housing 14 or flush with ends of the housing 14).

Each seal 22 can also define two apertures 24a and 24b to allow pins 26a and 26b to communicate between the socket 12 and circuit board 16. The apertures 24a and 24b can be circular, with diameters as large as or larger than diameters of the pins 26a and 26b. However, apertures 24a and 24b can have alternative shapes, such as shapes that allow the pins 26a and 26b to pass through the seal 22. The apertures 24a and 24b can also physically support the pins 26a and 26b. For example, each seal 22 can hold the pins 26a and 26b in position via a friction fit between the apertures 24a and 24b and the pins 26a and 26b, respectively. If the seals 22 are made from a material that is not electrically insulating, a rubber O-ring or other insulator can be included between the seal 22 and the pins 26a and 26b.

The pins 26a and 26b can physically and electrically connect the light 10 to the fixture 12. The pins 26a and 26b can be the sole physical connection between the light 10 and the fixture 12, though ends of the housing 14 and/or portions of the seals 22 can also contact the fixture 12. The pins 26a and 26b can be directly electrically connected to the circuit board 16 as shown in FIG. 1 to provide power to the LEDs 20 from the fixture 12, or the pins 26a and 26b can be coupled to another structure that in turn is electrically connected to the circuit board 16. Of the four total pins 26a and 26b, two of the total four pins 26a and 26b can be "dummy pins" that do not provide an electrical connection. Alternatively, instead of pairs of pins 26a and 26b, other types of electrical connectors depending on the type of fixture 12 can extend through the seals 22 or otherwise past the seals 22 into the housing 14. For example, a single pin can be used instead of two pins 26a and 26b for compatibility with a single pin fixture. Alternatively, three of the four total pins 26a and 26b can be "dummy pins" that do not provide an electrical connection, thereby permitting only one of the pins to electrically connect with the fixture 12.

Figure 2:
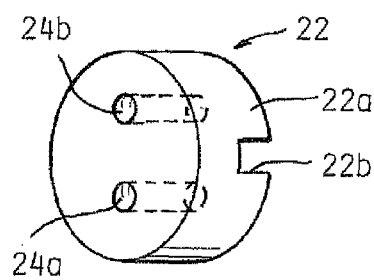
FIG. 2 is a perspective view of an example of the end cap replacing seal of FIG. 1.
Figure 3:
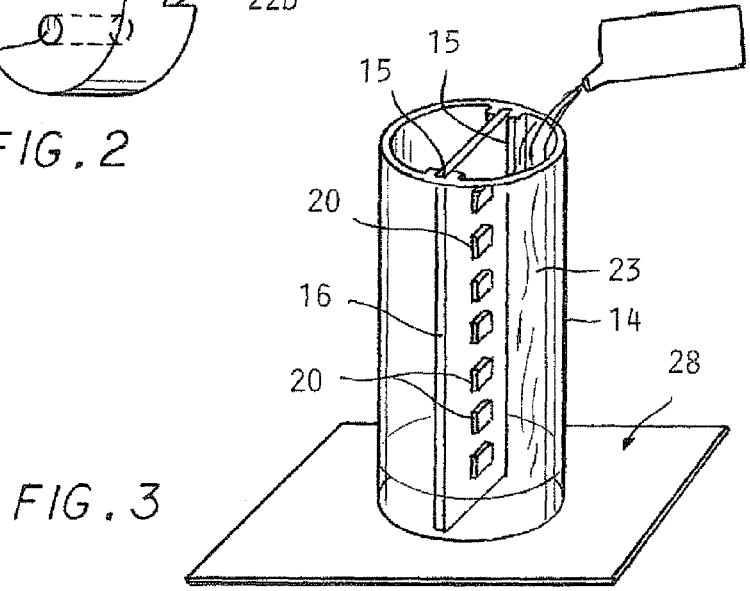
FIG. 3 is a perspective view of material being poured into a housing to form an end cap replacing seal.

A variety of methods can be used to manufacture the seals 22. In a first example, the seals 22 are formed from a liquefied or viscous material that is introduced to the housing 14, and then hardened in the position shown in FIG. 1. The liquefied or viscous material can be an epoxy prior to setting or mixing with a hardener, concrete prior to hardening, a polymer heated to above its melting point, melted wax, or another liquefied or viscous material. Several different processes can be used to form the seals 22 from the liquefied or viscous material depending on the characteristics of the material. For example, as shown in FIG. 3, the circuit board 16 can be engaged with the housing 14, and one end of the housing 14 can be sealed with a non-stick mat 28 or other structure while liquefied material 23 is poured into the top of the bore 17 of the housing 14. The seal 22 can be formed when the material 23 dries or cures, and the apertures 24a and 24b can be drilled in the seal 22 for the insertion of pins 26a and 26b. However, prior to inserting the pins 26a and 26b into the apertures 24a and 24b, the housing 14 can be rotated 180° and the seal 22 forming process can be repeated at the other end by pouring liquefied material 23 through one of the apertures 24a or 24b. Finally, the pins 26a and 26b can be inserted into the apertures 24a and 24b in each seal 22 and electrically connected to the circuit board 16. Alternatively, the circuit board 16 can be supported without being attached to the housing 14 during the seal 22 forming process, in which case the seals 22, once hardened or cured, can each define a groove 22b as shown in FIG. 2 for receiving and/or securing the circuit board 16.

As another example of manufacturing the seals 22, the housing 14 can be inserted into a pool of liquefied or viscous material, and the material can be allowed to harden to form the seal 22. The insertion can occur with the pins 26a and 26b already coupled to the housing 14 such that the seals 22 are formed to include apertures 24a and 24b without drilling, in which case sleeves can be installed over the portions of the pins 26a and 26b that engage the fixture 12 during insertion of the housing 14 into the pool of material in order to avoid getting material on the pins 26a and 26b.

If the material is too viscous to be poured into the housing 14, the material can be packed into an end of the housing 14. For example, pliable clay can be packed in an end of the housing 14 and then be allowed to dry, or silicone sealant can be applied in the end of the housing 14.

Figure 4:
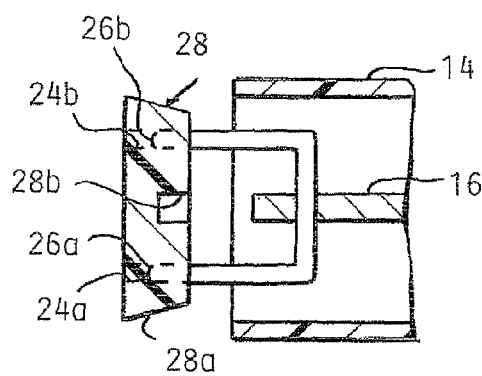
FIG. 4 is an exploded side view of an end cap replacing seal being inserted into a housing.

In yet another example, seals 28 as shown in FIG. 4 can be shaped prior to insertion into the housing 14. For example, each seal 28 can be made from an elastic material such as rubber or cork, and each seal 28 can shaped to have a perimeter 28a transitioning from slightly smaller than an inner circumference of the housing 14 to slightly larger than the inner circumference of the housing 14, allowing the seal 28 to be press fit into the housing 14 as shown in FIG. 4. If made from a less elastic material, each seal 28 can be shaped to have a perimeter slightly smaller than an inner circumference of the housing and a rubber O-ring or similar elastic strip can circumscribe the seal 28. By using O-rings, the seals 28 can be inserted into the housing 14 without substantially deforming the seals 28. Also, each seal 28 can define a groove 28b for receiving and/or securing the circuit board 16 similar to the groove 22b in the seal 22.

Also, regardless of the elasticity of the seals 28, installation of the seals 28 can include inserting the pins 26a and 26b through the apertures 24a and 24b in the seals 28 prior to the pins 26a and 26b being physically attached to the circuit board 16. For example, the pins 26a and 26b can be coupled by flexible wires to the circuit board 16, then inserted into the apertures 24a and 24b of the seals 28, and then the seals 28 can be press-fit into the housing 14. As another example, the pins 26a and 26b can be coupled to the circuit board 16 with the circuit board 16 disconnected from the housing 14. The pins 26a and 26b can then be inserted into the apertures 24a and 24b. Then, the circuit board 16 can be slid into the housing 14 until the seal 28 is press-fit into the housing 14, in which case the circuit board 16 is supported by the seals 28 instead of directly by the housing 14.

Additionally, structures other than seals 22 or seals 28 can be used instead of plastic end caps. For example, tape can be applied over ends of the housing 14, or the housing 14 can be formed of a solid rod that is drilled to accommodate pins 26a and 26b without end caps.

The above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A replacement light for a fluorescent tube usable in a fluorescent fixture, comprising:
   a housing having a first end and a second end opposite the first end;
   a support structure disposed within the housing;
   at least one LED positioned within the housing and arranged on the support structure;
   at least one electrical connector connected to the at least one LED; and
   a first seal having at least one aperture shaped to receive the at least one electrical connector and disposed within the first end of the housing, the first seal configured to conform to an inner circumference of the first end of the housing and an outer surface of the at least one electrical connector
   wherein the at least one electrical connector extends through the at least one aperture and is connectable to the fluorescent fixture.

2. The light of claim 1 wherein the at least one electrical connector is a first connector, further comprising:
   a second seal having at least one aperture shaped to receive a second electrical connector and disposed within the second end of the housing, the second seal configured to conform to an inner circumference of the second end of the housing and an outer surface of the second electrical connector.

3. The light of claim 1, wherein the first seal is made of at least one of epoxy, rubber, cork, gel, concrete, glass, clay, wax, a polymer and silicone.

4. The light of claim 1, wherein the first seal has a perimeter that is substantially equal to the inner circumference of the first end.

5. The light of claim 1, wherein the housing has a cylindrical cross-section and the first seal is generally disc-shaped such that the first seal is configured to contact substantially the entire inner circumference of the first end.

6. The light of claim 1, wherein the first seal contacts only a portion of the inner circumference of the first end.

7. The light of claim 1, wherein the first seal has a proximal end and a distal end opposite the proximal end, the proximal end one of flush with the first end and outwardly protruding from the first end.

8. The light of claim 7, wherein the distal end has a groove configured to engage one end of the support structure.

9. The light of claim 1, wherein the at least one aperture is shaped to secure the at least one electrical connector by a friction fit.

10. The light of claim 1, further comprising:
    a rubber O-ring disposed around and configured to insulate the at least one electrical connector.

11. A method of manufacturing a seal for a fluorescent tube replacement light for a fluorescent fixture containing at least one LED, comprising:
    providing at least one electrical connector;
    providing a housing having a first end and a second end opposite the first end;
    introducing a hardenable material to at least the first end of the housing;
    and hardening the hardenable material such that it conforms to an inner circumference of the first end and an outer surface of the at least one electrical connector to form at least one aperture; and
    extending the at least one electrical connector through that at least on aperture.

12. The method of claim 11, wherein the hardenable material is one of an epoxy without a hardener, liquid concrete, a polymer heated to above its melting point and melted wax.

13. The method of claim 11, wherein introducing a hardenable material to the first end of the housing further comprises:
    sealing the first end of the housing to a non-stick surface; and
    pouring the hardenable material into the second end of housing.

14. The method of claim 13, further comprising:
    forming at least one aperture into the hardened material of the first end of the housing;
    sealing the second end of the housing to the non-stick surface; and
    pouring the hardenable material into the at least one aperture; and
    hardening the hardenable material so that it conforms to an inner circumference of the second end.

15. The method of claim 14, further comprising: inserting the at least one electrical connector through the at least one aperture.

16. The method of claim 11, wherein introducing a hardenable material further comprises:
    inserting the first end of the housing into a pool of the hardenable material.

17. The method of claim 16, wherein the housing includes a support structure disposed therein and the at least one electrical connector electrically engaged with the support structure, further comprising:

installing a sleeve over the at least one electrical connector.

18. The method of claim 11, wherein introducing a hardenable material further comprises:

packing the hardenable material into the first end of the housing.

19. A replacement light for a fluorescent tube usable in a fluorescent fixture, comprising:

a housing having a first end and a second end opposite the first end;

a support structure disposed within the housing;

at least one LED positioned within the housing and arranged on the support structure; and sealing means for replacing a conventional end cap disposed within the first end of the housing wherein the sealing means includes at least one aperture shaped to receive at least one electrical connector.

20. The light of claim 19, further comprising:

at least one electrical connector extending through the sealing means and connectable to the fluorescent fixture.

21. A method of replacing a conventional end-cap for a fluorescent tube replacement light containing at least one LED, comprising;

providing a housing having a first end and a second end opposite the first end;

providing a first seal;

inserting the first seal into one of the first end and the second end of the housing; and conforming the first seal at the first end in such a manner to include an apeature shaped for receiving at least one electrical connector.

22. The method of claim 21 wherein the first seal is configured to conform to an inner circumference of the first end of the housing.

23. The method of claim 21, further comprising:

forming at least one aperture into the first seal of the housing; and inserting an electrical connector into the at least one aperture.

24. The method of claim 23, further comprising:

shaping the first seal prior to insertion into the housing.

25. The method of claim 24, wherein the first seal has a proximal end and a distal end opposite the proximal end, and wherein the first seal is shaped have a perimeter transitioning from slightly smaller at the proximal end than an inner circumference of the housing to slightly larger at the distal end than the inner circumference of the housing.

26. The method of claim 21, wherein the first seal is press-fit into the housing.

* * * * *